United States Patent
Gogo et al.

(10) Patent No.: US 10,363,774 B2
(45) Date of Patent: Jul. 30, 2019

(54) TUBELESS SPOKED WHEEL STRUCTURE

(71) Applicant: Honda Motor Co., Ltd., Tokyo (JP)

(72) Inventors: Kazuhiko Gogo, Saitama (JP); Kazuhiro Takatsuka, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 15/450,663

(22) Filed: Mar. 6, 2017

(65) Prior Publication Data

US 2017/0282639 A1   Oct. 5, 2017

(30) Foreign Application Priority Data

Mar. 31, 2016 (JP) ................ 2016-071752

(51) Int. Cl.
  *B60B 1/04* (2006.01)
  *B60B 21/06* (2006.01)
  *B60B 1/02* (2006.01)

(52) U.S. Cl.
  CPC .......... *B60B 1/043* (2013.01); *B60B 1/0261* (2013.01); *B60B 1/042* (2013.01); *B60B 1/045* (2013.01);
  (Continued)

(58) Field of Classification Search
  CPC ........ B60B 1/043; B60B 1/044; B60B 1/045; B60B 1/046; B60B 1/048; B60B 21/06;
  (Continued)

(56) References Cited

U.S. PATENT DOCUMENTS

| 6,116,344 A | * | 9/2000 | Longbottom | ....... E21B 41/0042 166/298 |
| 6,189,978 B1 | | 2/2001 | Lacombe et al. | |

(Continued)

FOREIGN PATENT DOCUMENTS

| EP | 1101631 A1 | * | 5/2001 | ............. B60B 1/003 |
| EP | 1167078 A1 | * | 1/2002 | ............. B60B 1/041 |

(Continued)

OTHER PUBLICATIONS

Office Action dated May 9, 2018 in a corresponding Japanese patent application No. 2016-071752, 4 pp.
(Continued)

*Primary Examiner* — Kip T Kotter
(74) *Attorney, Agent, or Firm* — United IP Counselors, LLC

(57) ABSTRACT

A tubeless spoked wheel including a rim and a hub connected with wire spokes includes a rim that has no through-hole and is narrow in the vehicle width direction. A plurality of internal threads are aligned circumferentially in an annular raised portion arranged along the centerline of a rim. A connecting member that is hollow and has an external thread on its outer periphery is screwed into each internal thread. Each connecting member is pre-engaged with a distal end of a spoke in a rotatable manner. Each spoke bends at a position outward from the connecting member, tilts toward a hub, and has its basal end connected to a right or left flange of the hub with a nipple. The spokes are connected to the annular raised portion to narrow the rim in the vehicle width direction. The spokes are rotatably supported on the connecting members.

17 Claims, 7 Drawing Sheets

(52) U.S. Cl.
CPC ............ *B60B 21/06* (2013.01); *B60B 21/064* (2013.01); *B60B 21/066* (2013.01); *B60B 1/04* (2013.01); *B60B 1/044* (2013.01); *B60B 2900/111* (2013.01); *B60B 2900/212* (2013.01); *B60B 2900/313* (2013.01); *B60B 2900/5116* (2013.01); *B60Y 2200/12* (2013.01); *Y02T 10/86* (2013.01)

(58) Field of Classification Search
CPC ... B60B 21/062; B60B 21/066; B60B 1/0215; B60B 1/0223; B60B 21/064; B60B 1/0261
See application file for complete search history.

(56) References Cited

U.S. PATENT DOCUMENTS

| | | | | |
|---|---|---|---|---|
| 6,497,042 | B1* | 12/2002 | Dietrich | B60B 1/041 |
| | | | | 29/894.333 |
| 6,736,462 | B1* | 5/2004 | Okajima | B60B 1/0223 |
| | | | | 29/894.33 |
| 7,192,098 | B2* | 3/2007 | Okajima | B60B 1/0284 |
| | | | | 301/58 |
| 7,357,460 | B2* | 4/2008 | Schlanger | B60B 1/0261 |
| | | | | 301/104 |
| 8,967,731 | B2* | 3/2015 | Goto | B60B 21/06 |
| | | | | 301/58 |
| 2001/0005099 | A1 | 6/2001 | Mercat et al. | |
| 2006/0103231 | A1* | 5/2006 | Fioravantil | B60B 1/0223 |
| | | | | 301/55 |
| 2013/0320749 | A1* | 12/2013 | Connolly | B60B 1/042 |
| | | | | 301/58 |

FOREIGN PATENT DOCUMENTS

| | | | | |
|---|---|---|---|---|
| FR | 1135511 A | * | 4/1957 | ........... B60B 21/062 |
| FR | 2813558 A1 | * | 3/2002 | ............. B60B 1/041 |
| JP | S59-35101 U | | 3/1984 | |
| JP | 2000-6601 A | | 1/2000 | |
| JP | 2001-213101 A | | 8/2001 | |
| WO | WO-9309963 A1 | * | 5/1993 | ........... B60B 21/062 |
| WO | 02/20338 A2 | | 3/2002 | |
| WO | 2011/137660 A1 | | 11/2011 | |

OTHER PUBLICATIONS

Office Action dated Sep. 26, 2017 in a corresponding Japanese patent application No. 2016-071752.

Extended European Search Report dated Oct. 4, 2017 in a corresponding European patent application No. 17158912.0.

* cited by examiner

TUBELESS SPOKED WHEEL STRUCTURE

CROSS-REFERENCE TO RELATED APPLICATIONS

This application claims the benefit of priority to Japanese Patent Application No. 2016-071752, filed on Mar. 31, 2016, the entire contents of which are hereby incorporated by reference.

BACKGROUND

1. Technical Field

The application relates to a tubeless spoked wheel structure, and particularly to a structure including a narrow rim in the vehicle width direction and thin spokes, and having high airtightness.

2. Description of the Background

A tubeless spoked wheel including a rim and a hub connected with spokes has, on both ends of the hub in the vehicle width direction, flanges with through-holes formed obliquely toward the hub. The through-holes receive spokes, which are placed through the holes from outside the rim and extend obliquely toward the hub, and are screwed in nipples attached on the outer edge of the hub (refer to Japanese Unexamined Patent Application Publication No. 2000-6601, herein after referred to as "Patent Literature 1").

BRIEF SUMMARY

The structure described in Patent Literature 1 has a large spoke angle, which causes the entire tubeless spoked wheel to have unnecessarily high rigidity. This structure also uses thick spokes that are highly rigid, and increases the weight of the tubeless spoked wheel.

With the spoke connections located on the rim flanges, the rim can be wide in the vehicle width direction, and the flanges protrude laterally from the vehicle. The spoke connections protrude further, and can be hit by stones or other matter when the vehicle is traveling on a rough road.

One or more aspects of the application are directed to a lightweight tubeless spoked wheel including a narrow rim in the vehicle width direction and thin spokes, while maintaining high airtightness.

In response to the above issue, a tubeless spoked wheel structure according to a first aspect of the invention includes a tubeless spoked wheel including a rim and a tire defining an air space, and wire spokes connecting the rim and a hub to integrate the wheel. The air space is sealed to maintain a pressure of the tire. The rim and each spoke are connected with a connection including an internal thread in the rim that is located on a centerline of the rim in a vehicle width direction and is not in communication with the air space, and a connecting member having an outer periphery including an external thread that is screwed into the internal thread. The connecting member has a hollow receiving one end of the spoke that is engaged rotatably about a central axis of the connecting member, and the connecting member is screwed into the internal thread.

In a second aspect of the present invention according to the first aspect, each internal thread in the rim extends parallel to a radial direction of the rim, and each spoke includes a bend extending from the connecting member rightward or leftward toward the hub.

In a third aspect of the present invention according to the first or second aspect, the internal threads in the rim are aligned circumferentially along the centerline of the rim in the vehicle width direction.

In a fourth aspect of the present invention according to the third aspect, the rim includes, in the vehicle width direction, a boss unit having the internal threads along the centerline, flanges in contact with the tire at ends of the rim, and hollows formed in portions connecting the boss unit and the flanges.

In a fifth aspect of the present invention according to the second aspect, the bend of each spoke has a bending angle equal to or less than 30°.

In a sixth aspect of the present invention according any one of the first to fifth aspects, the connecting member includes a large-diameter portion having the external thread and a spoke guide having a smaller diameter than the large-diameter portion integral with each other, and the spoke guide protrudes from the boss unit having the internal threads in the rim toward the hub.

In a seventh aspect of the present invention according to the sixth aspect, the spoke guide has a tool contact surface including a plane surface configured to stop rotation of a tool in contact with the surface.

In an eighth aspect of the present invention according to the sixth or seventh aspect, an end of the external thread in the connecting member is flush with an end of the corresponding internal thread in the rim when the external thread is screwed into the internal thread.

In a ninth aspect of the present invention according to any one of the first to eighth aspects, when the connecting member is screwed into the internal thread in the rim, a distal end of the connecting member in a fastening direction is placed into surface contact with a bottom of the boss unit.

In a tenth aspect of the present invention according to the ninth aspect, at least a part of the external thread in the connecting member is located more radially inward than an engagement between the connecting member and the spoke.

In the structure according to the first aspect of the present invention, each spoke is connected to the rim with the connection including the internal thread in the rim, which is located on the centerline of the rim in the vehicle width direction and is not in communication with the air space, and the connecting member, which is engaged with one end of the corresponding spoke, and is screwed into the corresponding internal thread. Thus, the rim has no through-hole, and the air space is kept airtight. This appropriately maintains the tire pressure.

The connecting members and the ends of the spokes are housed along the centerline of the rim in the vehicle width direction. This structure prevents the rim from protruding in the vehicle width direction. The vehicle is thus less likely to be hit by stones or other matter when traveling on a rough road. In particular, the connection between the rim and each spoke is protected from stones or other matter.

The resultant small spoke angle optimizes the rigidity of the entire structure, and supports the spokes rotatable relative to the connecting members. The rotation of the spokes disperses the stress. The spokes can thus be thinner to reduce the weight.

In the structure according to the second aspect of the present invention, each of the spokes with different tilts bends at a position outward from the corresponding connecting member and is linearly engaged with the connecting member. Thus, each of the internal threads extends substantially parallel to the radial direction. Each connecting member can be connected to the corresponding internal thread in the direction substantially parallel to the radial direction. Thus, each internal thread can extend substantially parallel to the radial direction. This eases the processing of the internal threads, and reduces the number of processes.

In the structure according to the third aspect of the present invention, the internal threads are aligned circumferentially along the rim. This improves the appearance. Further, the rim has the internal threads directly formed in its solid wall along the centerline in the vehicle width direction. Thus, the solid wall of the rim has higher strength between adjacent internal threads. This structure eliminates the need for bosses for reinforcement separately arranged for the internal threads. This reduces the weight of the rim.

In the structure according to the fourth aspect of the present invention, the hollows are formed in the portions connecting the boss unit having the internal threads to the flanges in contact with the tire. The hollows reduce the weight of the rim. Moreover, the walls, which define the hollows, each serve as a rib to increase the rigidity of the rim.

In the structure according to the fifth aspect of the present invention, the bending angle of each spoke is equal to or less than 30°. This increases and optimizes the strength of the spokes. The spokes can thus be thinner than in conventional structures, while maintaining the intended high strength. This further reduces the weight of the wheel.

In the structure according to the sixth aspect of the present invention, the connecting member includes the large-diameter portion having the external thread that is connected to the internal thread in the rim, and the spoke guide having the smaller diameter than the large-diameter portion. The large-diameter portion and the spoke guide are integral with each other. Additionally, with the large-diameter portions connected to the internal threads in the rim, only the spoke guides protrude from the rim. Thus, smaller portions of the connecting members protrude from the rim. This reduces the weight of the wheel, and improves the appearance.

In the structure according to the seventh aspect of the present invention, the spoke guide has the tool contact surface. The tension of each spoke can be adjusted by rotating the connecting member using a tool to adjust the tightening margin of the connecting member.

In the structure according to the eighth aspect of the present invention, when the connecting member is connected to the rim, the end of the external thread in the connecting member is flush with the end of the internal thread in the rim, and the connecting member does not protrude from the rim. This improves the appearance.

In the structure according to the ninth aspect of the present invention, when the connecting member is screwed into the internal thread in the rim, its distal end is placed into surface contact with the bottom of the threaded bore. Thus, the bolt tightening margin of the connecting member can be increased, and the protruding amount of the portion on the rim, which serves as a boss unit for the internal thread, can be reduced. This reduces the weight of the wheel.

In fastening the connecting member, the connecting member is positioned by its distal end coming into surface contact with the bottom of the threaded bore. This eases the assembling work.

In the structure according to the tenth aspect of the present invention, at least a part of the external thread arranged on each connecting member is located more radially inward than the engagement between the connecting member and the spoke. Thus, the force applied through the spoke is distributed across the entire connection between the external thread and the internal thread. This appropriately maintains the reliable connection between the external thread and the internal thread.

DETAILED DESCRIPTION

An embodiment will now be described with reference to the drawings.

Figure 1:
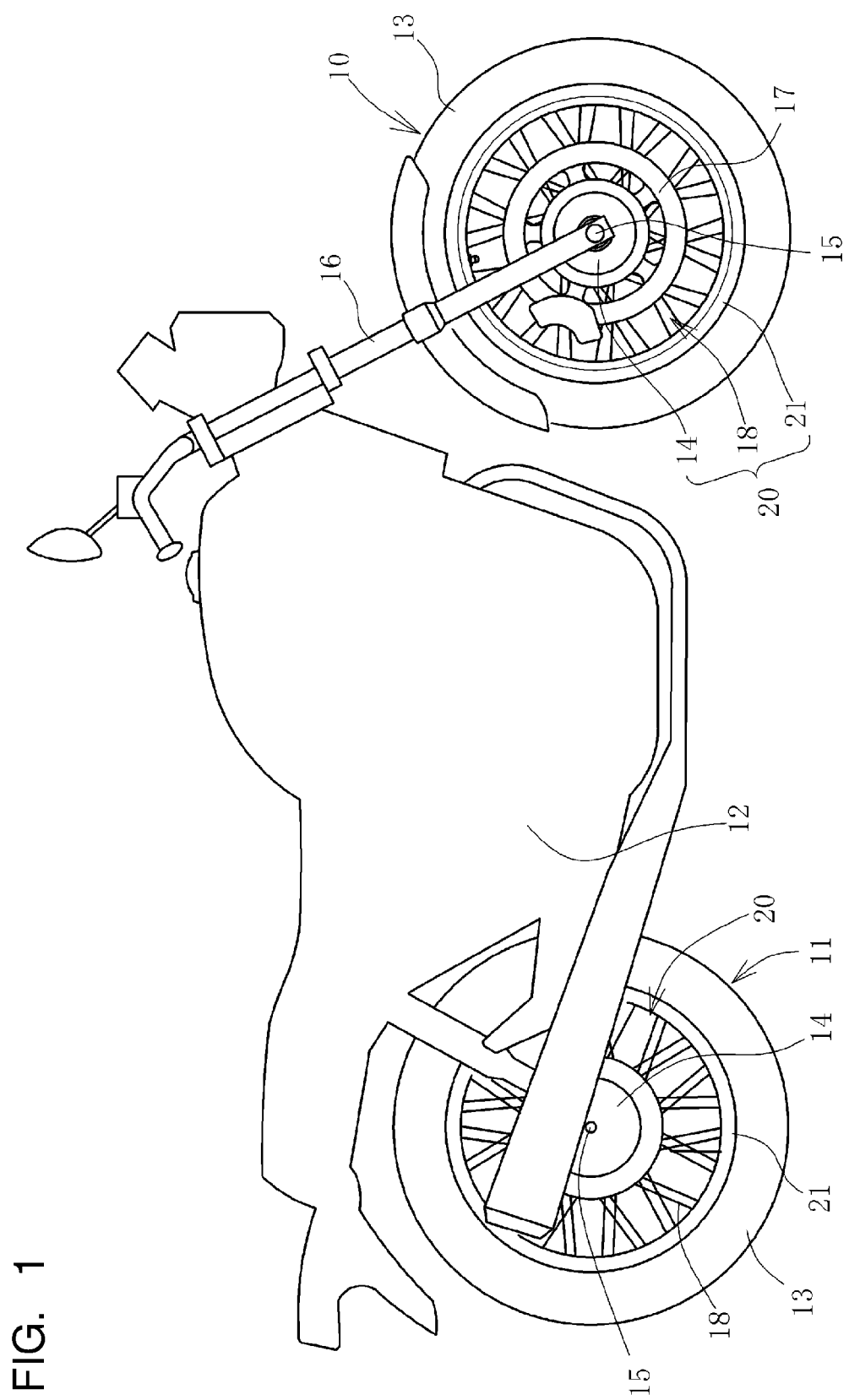
FIG. 1 is a side view of a motorcycle according to an embodiment.

FIG. 1 is a right-side view of a motorcycle including a body 12, and a tired front wheel 10 and a tired rear wheel 11 supported at the front and the rear of the body 12. Each of the tired front and rear wheels 10 and 11 includes a tubeless spoked wheel according to an embodiment. The body 12 is schematically drawn without a detailed structure.

Each of the tired front and rear wheels 10 and 11 includes a tubeless tire (hereafter, a tire) 13 mounted on its outer periphery. The tired front wheel 10 has a central hub 14, which is connected to a front fork 16 via an axle 15. The hub 14 has a brake disc 17 on its side surface.

The tired front wheel 10 will now be described. The tired rear wheel 11 includes the same tubeless spoked wheel as the tired front wheel 10.

The tired front wheel 10 includes a tire 13, and a tubeless spoked wheel (hereafter simply, wheel) 20 on which the tire 13 is mounted.

The wheel 20 includes a large annular rim 21 on which the tire 13 is mounted, the hub 14 at the center spaced from the rim, and wire spokes 18 connecting the rim and the hub. The spokes 18 include four different types with different tilts, which will be described later.

The hub 14 is a cylindrical body that is cast using a light alloy (an aluminum alloy in this example). The hub 14 contains the axle 15 and its bearing (not shown). The hub 14 includes a cylindrical axle housing 30, which rotatably supports the axle 15, and a pair of right and left flanges 31 and 32, which are arranged upright near the two axial ends of the axle housing. The axle housing 30 and the right and left flanges 31 and 32 are integral with one another. The cylinder of the axle housing 30 has the central axis extending in the vehicle width direction. The axle housing 30 is coaxial with the axle 15, and this axial direction is the vehicle width direction. The vehicle width direction is also the right-left direction of the vehicle body. The arrow heads RH and LH in FIG. 2 indicate the right and the left of the vehicle body.

Figure 3:
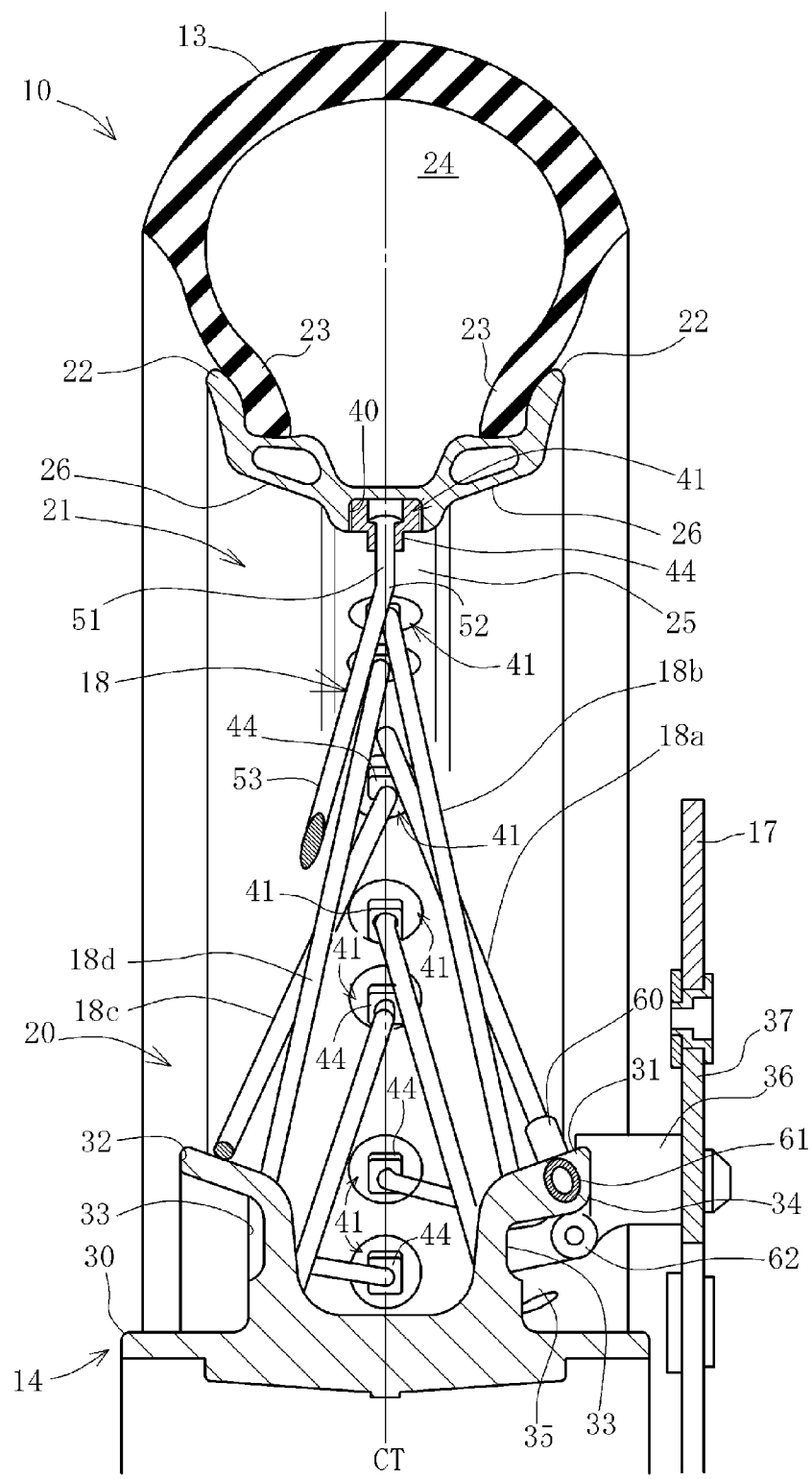
FIG. 3 is a cross-sectional view (partial) of the tired front wheel. 4 is a side view of the front wheel without the tire.

As shown in FIG. 3, the spokes 18 have their distal ends (ends adjacent to the rim 21) connected, with connecting members 41, to an annular raised portion 25, which is arranged along the centerline of the rim 21 in the vehicle width direction. The spokes 18 extend rightward or leftward symmetrically toward the central hub 14, and are connected to the right flange 31 or the left flange 32 of the hub 14 with nipples 60.

The spokes 18 include right spokes connecting the annular raised portion 25 to the right flange 31 and left spokes connecting the annular raised portion 25 to the left flange 32.

The rim 21 has a substantially C-shaped cross section that is open radially, outwardly (as illustrated in the figure), and includes a pair of side flanges 22 that bend radially outwardly to the left and to the right. Sidewalls 23 of the tire 13 are tightly fit into the side flanges 22. This tubeless structure defines a sealed air space 24 between the rim 21 and the tire 13, and eliminates a conventional inner tube.

The rim 21 integrally includes the annular raised portion 25, which protrudes radially inwardly, along the centerline in the vehicle width direction. The annular raised portion 25 extends along a centerline CT of the rim 21 in the vehicle width direction (the radial line in the middle of the rim 21 in the vehicle width direction, or the centerline of the wheel 20 in the vehicle width direction) continuously across the entire periphery. The connecting members 41 are screwed into nuts 40 in the annular raised portion 25. The nuts 40 and the connecting members 41 are aligned circumferentially across the entire periphery. The annular raised portion 25 may also be formed by coning.

Each of the connecting members 41 is a hollow bolt, which contains a spoke head 50 of a spoke 18 and a distal end 51 extending from the head. The spoke head 50 is thus engaged in the connecting member 41 (refer to FIG. 5A). The spoke 18 extends radially inwardly from the connecting member 41 and bends to have a rightward or leftward tilted extension 53. The tilted extension 53 has a part adjacent to the hub 14, which is the basal end of the spoke. The basal end of the spoke has an external thread (refer to FIGS. 7A and 7B), which is screwed in the nipple 60.

The rim 21, the nuts 40, and the connecting members 41 will be described in detail later.

The right flange 31 is connected to the basal ends of two types of right spokes, which are forward-tilted spokes 18a and rearward-tilted spokes 18b (both described later).

The left flange 32 is connected to the basal ends of two types of left spokes, which are forward-tilted spokes 18c and rearward-tilted spokes 18d (both described later).

The connections between the spokes and the flanges will be described in detail later.

The right and left flanges 31 and 32 are located slightly inside the ends of the axle housing 30, which protrude outwardly from the tire 13 in the vehicle width direction, and are located inwardly from the tire 13.

At one side of the hub 14, a brake disc boss 36 protrudes outwardly from the right flange 31 and the end of the axle housing 30, and a connection ring 37 is bolted at a position outside the tire 13. The outer periphery of the connection ring 37 is connected to the inner periphery of the brake disc 17.

The brake disc 17 may also be arranged at each of the right and left sides of the tired front wheel 10, In this case, the brake disc boss 36 is also arranged on each side of the hub 14.

Figure 4:
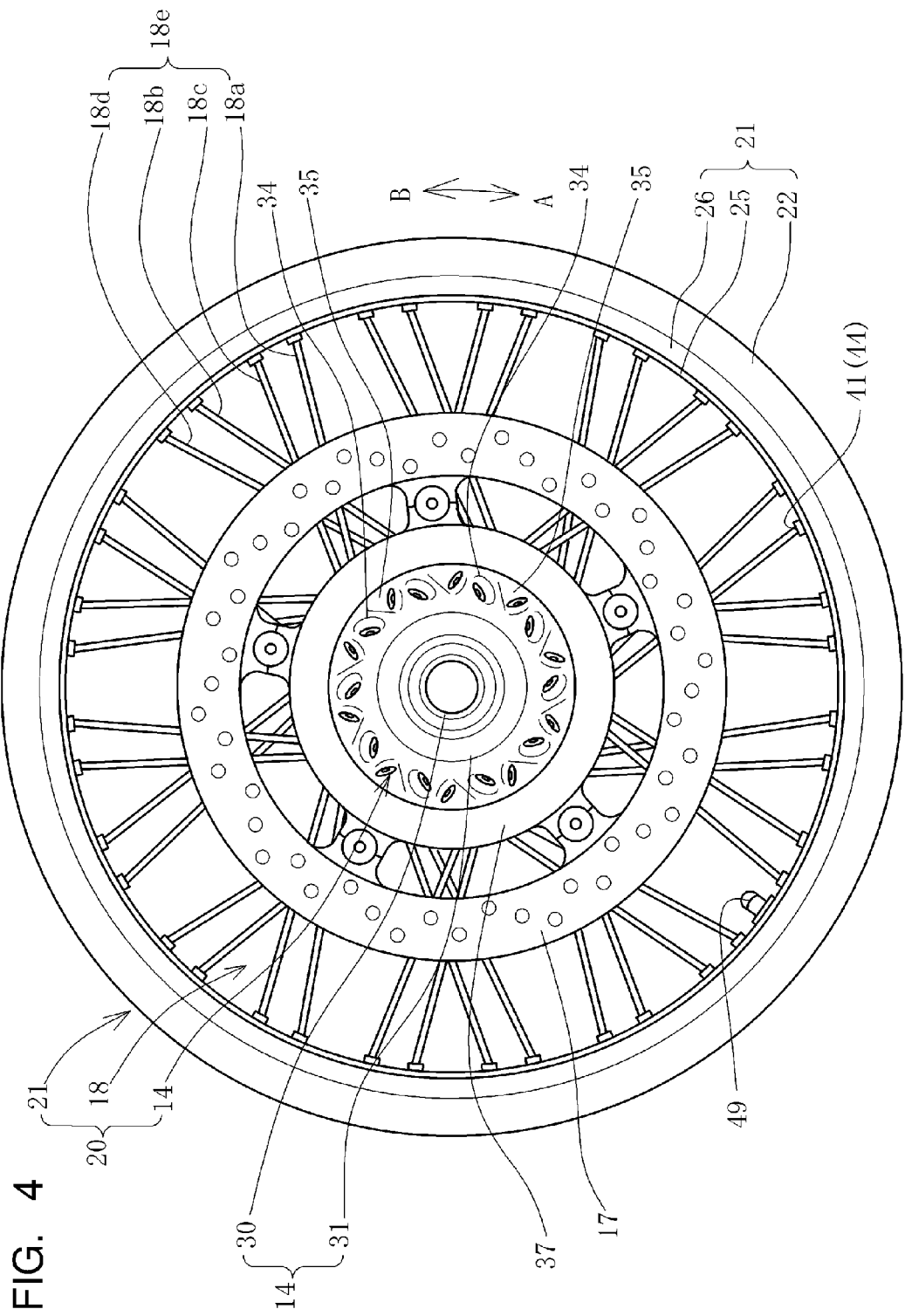

As shown in FIG. 4 as well, the right spokes include the forward-tilted spokes 18a extending from the right flange 31 to the annular raised portion 25 and tilted in a rotational forward direction A, and the rearward-tilted spokes 18b tilted in a rotational rearward direction B. The forward-tilted spokes 18a and the rearward-tilted spokes 18b intersect with each other in X shapes as viewed from the side in the figure to increase the rigidity of the wheel 20.

Figure 2:
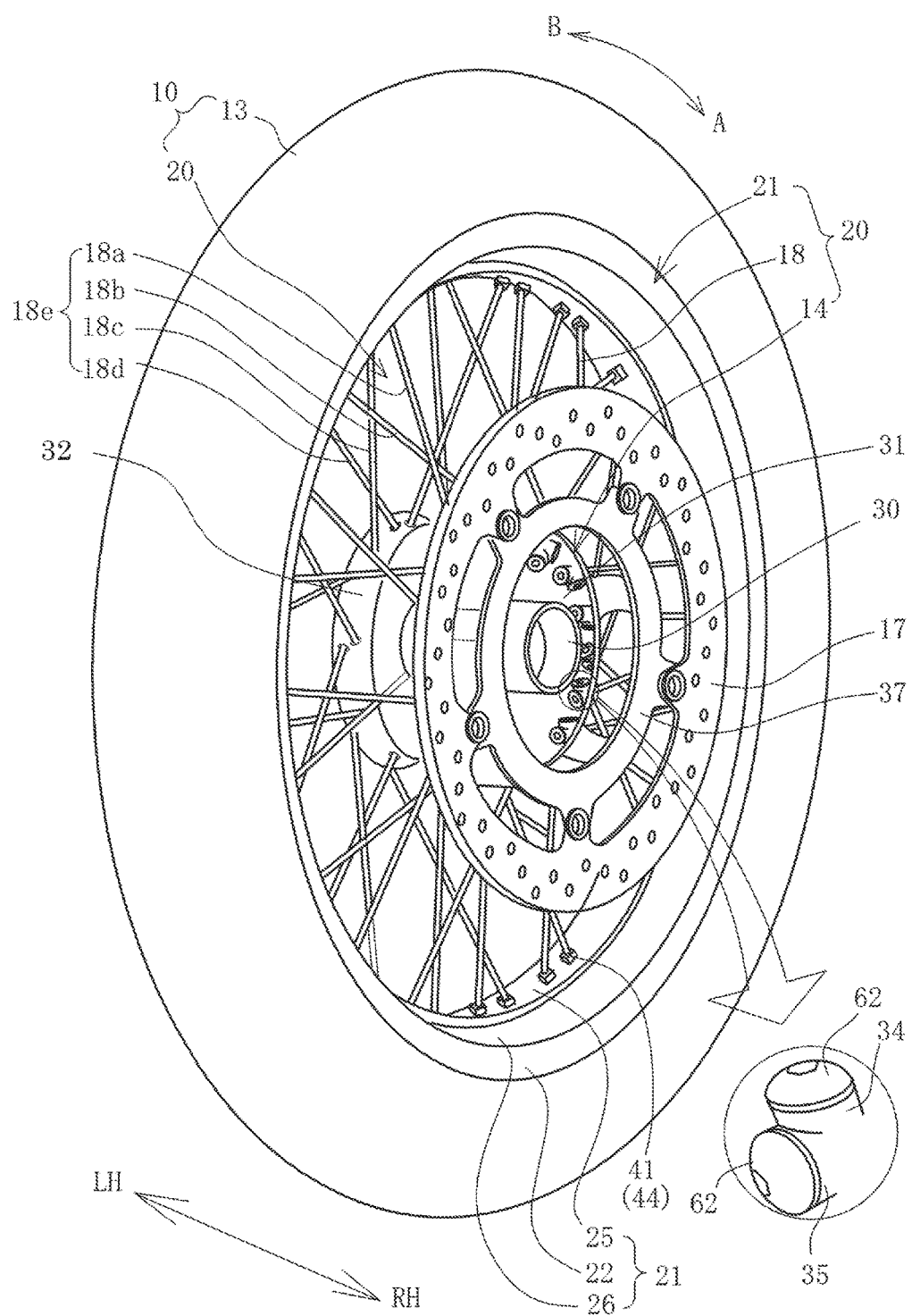
FIG. 2 is a perspective view of a tired front wheel of the motorcycle.

The left spokes also include the forward-tilted spokes 18c tilted in the forward rotational direction A and the rearward-tilted spokes 18d tilted in the rearward rotational direction B (refer to FIGS. 2 and 3).

The spokes 18 can thus be in spoke sets 18e each including four differently tilted spokes. These spoke sets 18e are arranged circumferentially at regular intervals on the wheel 20.

Each spoke 18 is formed from steel (stainless steel in this example).

These spokes will simply be referred to as the spokes 18, when no differentiation between these spoke sets is intended. In FIG. 4, an air inlet 49 is shown.

The connections between the rim 21 and the spokes 18 will now be described in detail.

Figure 5A:
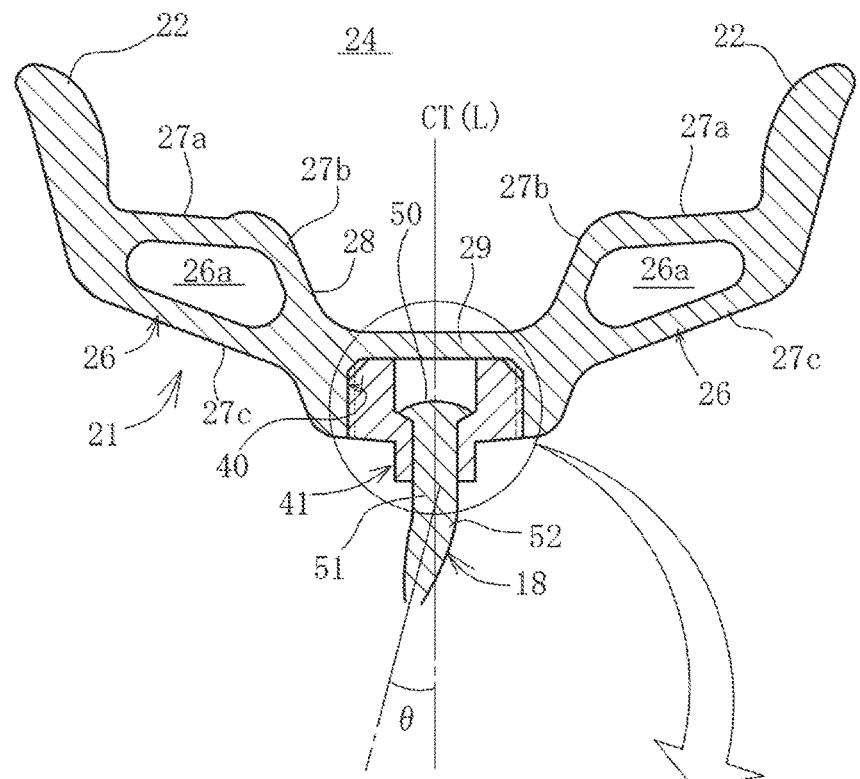
FIG. 5A is a cross-sectional view of a rim of the wheel.

As shown in FIG. 5A, the rim 21 includes shoulder beads 26, which connect the side flanges 22 and the annular raised portion 25. The shoulder beads 26 have their inner peripheral surfaces sloping outwardly from the annular raised portion 25 toward the side flanges 22 in the cross-sectional view.

The shoulder beads 26 have their outer peripheral surfaces forming flat walls 27a, which are substantially horizontal and are exposed to the air space 24. The portions of the flat walls 27a adjacent to the centerline in the vehicle width direction continue to slope walls 27b that are tilted radially inwardly. The slope walls 27b are right and left parts facing each other across the centerline CT. The right and left slope walls 27b define an annular recess 28 between them.

The annular recess 28 is open toward the air space 24. The annular recess 28 has a bottom 29, which integrally connects the right and left slope walls 27h. The annular recess 28 is annular across the entire periphery along the centerline CT, and is opposite to the annular raised portion 25 across the bottom 29 (or is adjacent to the air space 24).

The shoulder beads 26 have radially wide portions between their inner peripheral surfaces and the flat walls 27a. The wide portions protrude toward the air space 24. The shoulder beads 26 have internal holes 26a to reduce the weight. The holes 26a are annular and are circumferentially continuous across the entire periphery. The holes 26a are defined by the flat walls 27a, the slope walls 27b, and the inner peripheral walls 27c.

The inner peripheral walls 27c are located more radially inward than the holes 26a in the shoulder beads 26. The flat walls 27a and the slope walls 27b serve as ribs for increasing the rigidity.

In particular, the inner peripheral walls 27c, which slope outwardly toward the side flanges 22, face the flat walls 27a, which extend substantially horizontally toward the side flanges 22, across the hollows 26a. This structure increases the rigidity of the rim 21. This structure increases the strength of the rim 21 although the rim 21 flares from the centerline in the vehicle width direction toward the right and left side flanges 22.

The connection of each connecting member 41 to the annular raised portion 25 will now be described.

Figure 6A:
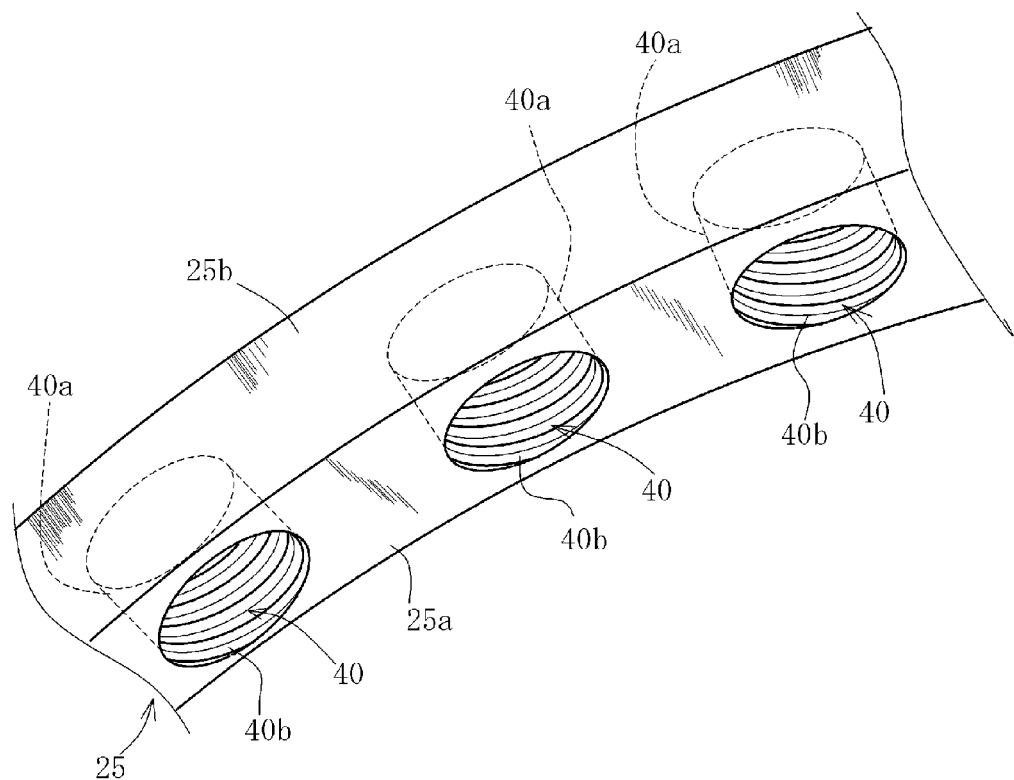
FIG. 6A is a perspective view of nuts in the rim.
Figure 6B:
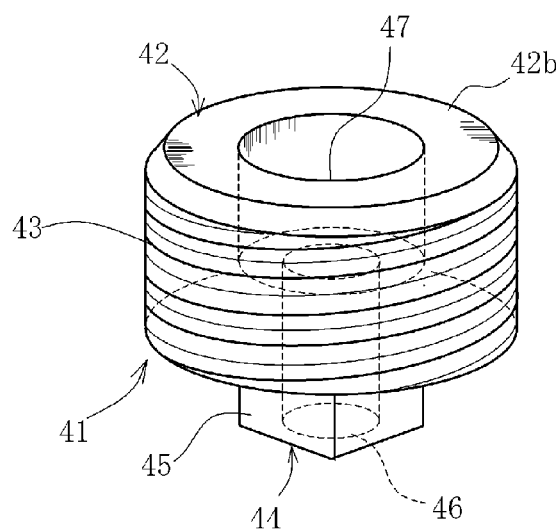
FIG. 6B is a perspective view of a connecting member.

Each nut 40 formed in the annular raised portion 25 has an internal thread 40b (refer to FIG. 6A), into which an external thread 43 on a large-diameter portion 42 of a connecting member 41 is screwed (refer to FIG. 6B). This connects the distal end of the spoke 18 pre-supported on the connecting member 41 to the rim 21 (annular raised portion 25).

Figure 5B:
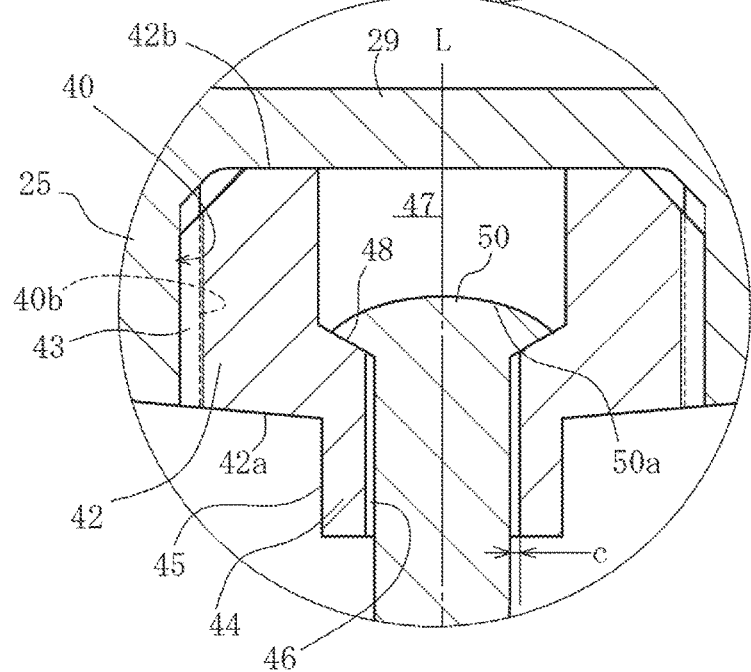
FIG. 5B is an enlarged cross-sectional view of the rim of the wheel.

FIG. 6A is a perspective view showing a part of the annular raised portion 25 viewed from the center (from the hub 14). As shown in the figure, the annular raised portion 25 protrudes radially inwardly to have a substantially trapezoidal cross-section (refer to FIG. 5B); and has an inner peripheral surface 25a and right and left sides 25b. The nuts 40 are formed on the inner peripheral surface 25a. Each nut 40 includes a radially outward threaded bore 40a formed in the inner peripheral surface 25a and an internal thread 40b cut on the inner periphery of the bore.

The nuts 40 are aligned circumferentially at predetermined intervals across the entire periphery of the annular raised portion 25.

The annular raised portion 25 also serves as a boss unit in which the internal threads 40b of the nuts 40 are to be formed. The annular raised portion 25 protrudes radially, inwardly to have a height corresponding to the length of the internal thread 40b, along the centerline of the rim 21 in the vehicle width direction. As viewed from the side (FIG. 4), the annular raised portion 25, together with the side flange 22 and the shoulder bead 26, allows the rim 21 to appear larger. The inner peripheral surface 25a of the annular raised portion 25 also forms the opening edges of the threaded bores 40a.

As shown in FIG. 5A, the nuts 40 open radially inwardly, whereas their radially outward sides are covered by the bottom 29 of the annular recess 28 and are thus separated from the air space 24. This structure prevents the air in the air space 24 from leaking through the nuts 40, and achieves the airtightness around the connections of the spokes 18.

The inner peripheral surface of the bottom 29 adjacent to each nut 40 forms a right angle with the central axis L and is flat in the cross-sectional view, and is in contact with the upper end surface (as illustrated) of the connecting member 41.

As in the perspective view of FIG. 6B, each connecting member 41 is a stepped hollow bolt, and includes a large-diameter portion 42 and a small-diameter spoke guide 44 integral with each other. The large-diameter portion 42 and the spoke guide 44 are connected with a step 42a.

The large-diameter portion 42 of the connecting member 41 is fit in the nut 40, and has its outer peripheral surface with the external thread 43, which is to be screwed into the internal thread 40b of the nut 40.

The spoke guide 44 is coaxial with and extends from the large-diameter portion 42 radially inwardly (downward as illustrated), and has its outer periphery thinner than the large-diameter portion 42, and has a tool contact surface 45 including plane surfaces that stop rotation of a tool for rotating the connecting member 41 when coming in contact with the tool.

The cross-section of the tool contact surface 45 orthogonal to the external thread axis of the spoke guide 44 (aligning with the central axis L of the connecting member 41) has a D-shape profile, a profile with two parallel planes, or a profile with pairs of parallel plane surfaces such as a quadrangle (a quadrangle in this example) to stop rotation of a tool. An appropriate tool, such as a wrench, being engaged with the tool contact surface 45, is rotated to rotate the entire connecting member 41 to connect or disconnect the external thread 43 to or from the nut 40.

As in the enlarged view in FIG. 5B, the connecting member 41 has a hollow that is a through-hole along the central axis L. This hollow includes a small-diameter spoke hole 46 defined in the spoke guide 44 and a large-diameter wide recess 47 defined in the large-diameter portion 42. The spoke hole 46 and the wide recess 47 are connected with a step 48. The step 48 in the connecting member 41 defines the bottom of the wide recess 47, and is tapered toward the spoke hole 46.

The wide recess 47 has an inner diameter slightly larger than the diameter of the spoke head 50, and opens upward in the figure. When the basal end of the spoke 18 is placed through the opening into the spoke hole 46, the spoke head 50 abuts against the step 48. The spoke 18 engaged and supported in this manner is prevented from slipping off radially inwardly.

The spoke head 50 is formed by, for example, squashing one end of the spoke 18 into a mushroom shape having a larger diameter than the spoke 18 and protruding in a direction orthogonal to the axis. The lower surface of the spoke head 50 is a tapered surface 50a in correspondence with the step 48.

The large-diameter portion 42 of the connecting member 41 has an axial length substantially the same as the hole depth of the nut 40 (the length of the internal thread 40b). Thus, when the connecting member 41 is positioned with a distal end 42b of its large-diameter portion 42 (the upper end as illustrated, as well as the distal end in the fastening direction) being in surface contact with the lower end surface of the bottom 29, the surface of the step 42a, which is the lower surface of the large-diameter portion 42 as illustrated, is flush with the inner peripheral surface 25a of the annular raised portion 25 (the lower surface around the nut 40 as illustrated).

The position of connection of the nut 40 to the external thread 43 is radially, outwardly) higher than the position of engagement between the spoke head 50 and the step 48 in the figure. As illustrated, at least the lower end of the external thread 43 is located more radially inward (lower in the figure) than the position of engagement between the spoke head 50 and the step 48.

Each spoke 18 has the distal end 51 continuous to its spoke head 50. The distal end 51 is a linear portion parallel to the central axis L of the connecting member 41 and is placed through the spoke hole 46. The distal end 51 is slightly longer than the spoke hole 46. The distal end 51 has an outer diameter slightly smaller than the inner diameter of the spoke hole 46, and thus has a clearance c with the inner peripheral surface of the spoke hole 46. The clearance c, the tapered surface 50a of the spoke head 50, and the tapered surface of the step 48 together allow the spoke 18 to rotate about the central axis L.

The spoke 18 further includes a bend 52, which extends radially inwardly from the spoke guide 44. The spoke 18 bends either to the right or to the left at the bend 52.

The spoke 18 further includes the tilted extension 53, which is located radially inwardly from the bend 52. The tilted extension 53 extends linearly to the hub 14. The bending angle θ is equal to or less than 30°.

The forward-tilted spokes 18a of the right spokes each have a bending angle θ larger than the bending angle of the rearward-tilted spokes 18b (refer to FIG. 3). The left spokes have the bending angle θ to be symmetrical to the right spokes with respect to the centerline CT. More specifically, the spokes have four different bending angles θ in accordance with their degrees of bending. The spokes each have the bending angle θ of 30° or less to allow the hub 14 to be narrow in the vehicle width direction, and be compact and highly durable.

Figure 7A:
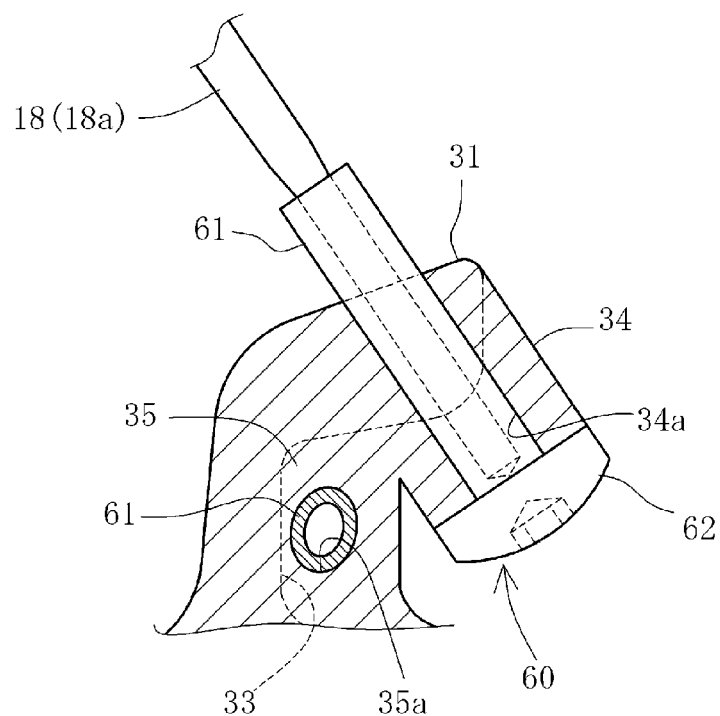
FIG. 7A is a cross-sectional view of a connection at a hub of the wheel.
Figure 7B:
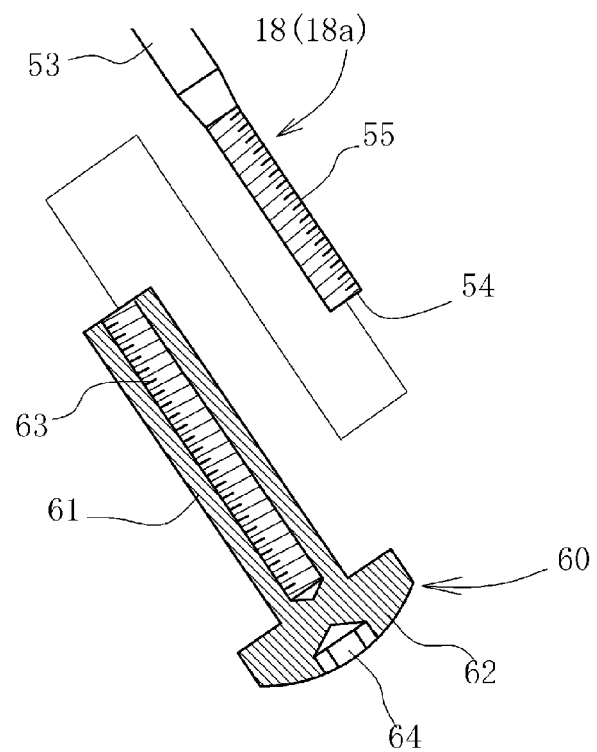
FIG. 7B is a diagram describing a spoke being joined to a nipple.

FIG. 7A is an enlarged cross-sectional view of the connection between the basal end 54 of the spoke 18 and the hub 14. FIG. 7B is a diagram describing the basal end 54 of the spoke 18 being joined to the nipple 60.

Although the connection between the right forward-tilted spoke 18a and the right flange 31 is described below, the same applies to other spokes.

As shown in FIG. 7A, the basal end 54 of the right forward-tilted spoke 18a has an external thread 55, which is screwed into the nipple 60 pre-supported on the right flange 31.

The right flange 31 has forward bosses 34, which are integral with the flange. Each forward boss 34 has a through-hole 34a, which is parallel to the tilted extension 53 of the corresponding right forward-tilted spoke 18a.

The right flange 31 further has rearward bosses 35, which are integral with the flange, in addition to the forward bosses 34 (refer to FIG. 4). The rearward bosses 35 are located more inwardly in the vehicle width direction than the forward bosses 34. Each rearward boss 35 has a through-hole 35a, which is parallel to the tilted extension 53 of the corresponding right rearward-tilted spoke 18b.

The outer surface of the right flange 31 has a side recess 33, which is defined inwardly in the vehicle width direction (refer to FIG. 3). The side recess 33 has the for bosses 34 and the rearward bosses 35 integral with the right flange 31.

Each forward boss 34 protrudes at the same tilt angle relative to the outer surface of the right flange 31 as the corresponding forward-tilted spoke 18a. Each rearward boss 35 protrudes, in the direction opposite to the forward bosses 34, at the same tilt angle as the corresponding rearward-tilted spoke 18b. The left flange 32 has the structure symmetrical to this structure.

As shown in FIG. 7B, the radially inner end of the tilted extension 53 of the spoke 18 is the basal end 54, which has the external thread 55. The external thread 55 is screwed into the nipple 60. The nipple 60 includes a boss 61 and a nipple head 62 integral with each other. The boss 61 has an internal thread 63, which engages with the external thread 55 of the basal end 54. The nipple head 62 has a tool engagement part 64. The tool engagement part 64 is a recess for receiving an appropriate tool for rotating the nipple 60, such as a driver or a hexagon socket screw key, and has a known appropriate shape such as a straight line or a cross groove and a hexagon socket.

The boss 61 of the nipple 60 is placed forwardly in the rotational forward direction A through the through-hole 34a in the forward boss 34. When the nipple head 62, with the basal end 54 being fit in the boss, is rotated using the appropriate tool, the external thread 55 of the basal end 54 and the internal thread 63 of the boss 61 of the nipple are screwed together. The external thread 55 of the rearward-tilted spoke 18b is screwed into the rearward boss 35 in which the nipple 60 is fit rearwardly.

The advantages of the present embodiment will now be described.

As shown in FIG. 5B, the basal end 54 of the spoke 18 is placed through the spoke hole 46 from the wide recess 47 in the connecting member 41, and the spoke head 50 is placed in the wide recess 47. The spoke head 50 is abutted against and engaged with the step 48.

The large-diameter portion 42 of the connecting member 41 is then fit in the nut 40, and an appropriate tool is engaged with the tool contact surface 45 of the spoke guide 44 and is rotated.

This rotates the connecting member 41 to cause the external thread 43 to be screwed into the internal thread 40b in the nut 40, and the large-diameter portion 42 to be connected to the annular raised portion 25.

In this state, the spoke 18 extends radially inwardly from the spoke guide 44 of the connecting member 41 and bends at the bend 52, from which the tilted extension 53 extends. The tilted extension 53 has a predetermined bending angle θ. As shown in FIG. 3, the tilted extension 53 is oriented to the right or the left, and the basal end 54 is oriented to the right flange 31 or the left flange 32 on the hub 14.

As shown in FIGS. 7A and 7B, the boss 61 of the nipple 60 is placed through the forward boss 34 or the rearward boss 35 on the right flange 31 or the left flange 32, and receives the basal end 54 of the spoke 18. When the nipple 60 is rotated using an appropriate tool engaged with the tool engagement part 64 in the nipple head 62, the internal thread 63 of the boss 61 and the external thread 55 on the basal end 54 are screwed together. This fastens the basal end 54 to the nipple 60 and connects the basal end 54 to the hub 14 with the nipple 60.

As a result, the spoke 18 has its distal end 51 connected to the annular raised portion 25 on the rim 21 with the connecting member 41, and its basal end 54 connected to the hub 14 with the nipple 60.

The spoke guide 44 and/or the nipple head 62 can be rotated to allow the spoke 18 to have predetermined tension.

The spoke guide 44 and the nipple head 62 are arranged at positions where they are always visible from outside and are easily accessible to the user for rotating these parts with a tool to adjust the tension as appropriate when the vehicle is in use.

Additionally, the tension can be adjusted on either of the spoke guide 44 or the nipple head 62. The user can select either part that is more convenient. This improves the workability further.

However, the spoke guide 44, which has been tightened to its limit when the wheel is assembled, is adjustable to loosen only.

The wheel 20 is assembled in this manner into the tubeless spoked wheel shown in FIG. 4. The wheel with the tire 13 is further fit on the outer periphery of the rim 21 as shown in FIGS. 1 to 3. As shown in FIGS. 3 and 5, each internal thread 40b, in which the connecting member 41 holding the distal end 51 of the spoke 18 is screwed, is arranged in the annular raised portion 25 on the inner peripheral surface of the rim 21, with the threaded bore 40a covered by the bottom 29. Thus, the threaded bore 40a is not formed through the rim 21 and is not in communication with the air space 24 defined between the rim 21 and the tire 13.

More specifically, the air space 24 communicates with no through-hole to the outside of the rim 21, and thus is kept airtight. The tubeless structure maintains a predetermined tire pressure and has high reliability.

The connecting members 41 are connected to the annular raised portion 25 arranged along the centerline of the rim 21 in the vehicle width direction. The connecting members 41 and the distal ends 51 of the spokes 18 are housed along the centerline of the rim 21 in the vehicle width direction. This structure prevents the rim 21 from protruding in the vehicle width direction.

The vehicle is thus less likely to be hit by stones or other matter when traveling on a rough road. In particular, the connections between the rim 21 and the spokes 18 including the connecting members 41 are protected from stones or other matter.

As shown in FIG. 3, each spoke 18 connects the annular raised portion 25 on the centerline of the rim 21 in the vehicle width direction and the right flange 31 or the left flange 32 on the hub 14. This structure can have a relatively small angle of each spoke 18 connecting the hub 14 and the rim 21, and can increase the strength of the spoke 18 with an appropriate rigidity of the entire wheel 20 that is not too high. This allows each spoke 18 to be thinner than in conventional structures, while maintaining its intended high strength.

As shown in FIG. 5A, the spoke head 50 is engaged with and supported on the step 48 of the connecting member 41 rotatably about the central axis L of the connecting member 41. When pulled, the spoke 18 can rotate relative to the connecting member 41. This rotation can disperse the stress applied to the spoke 18. The spokes 18 can thus be thinner to reduce the weight of the wheel 20.

Additionally, as shown in FIGS. 3 and 6A, the nuts 40 are aligned circumferentially along the annular raised portion 25. This improves the appearance. The annular raised portion 25, which is as high as the length of the internal thread 40b, is arranged across the entire periphery. This annular raised portion 25, which can contribute to better appearance, improves the appearance. Further, the annular raised portion 25 has the internal threads 40b directly formed in its solid wall, and functions as an integral boss unit including bosses for all the nuts 40. Thus, the solid wall of the annular raised portion 25 has higher strength between adjacent internal threads 40b. This structure eliminates the need for bosses for reinforcement separately arranged for the internal threads 40b. This reduces the weight of the rim 21.

As shown in FIGS. 3 and 5, the spokes and the connecting members 41 are arranged in correspondence with each other. Each of the spokes 18 bends at a position outward from the corresponding connecting member 41 and is linearly engaged with the connecting member 41. Each connecting member 41 can thus be connected to the corresponding nut 40 in a direction substantially parallel to the radial direction.

Thus, the internal thread 40b on each nut 40 also extends in the direction substantially parallel to the radial direction.

For the spoke sets 18e each having four spokes 18a to 18d with different tilts, which serve as the spokes 18, the processing axes of all the internal threads 40b are substantially parallel to the radial direction. This eases the processing for the internal threads, and reduces the number of processes. In addition, all the nuts 40 having the internal threads 40b can be aligned circumferentially.

As in the enlarged view in FIG. 5B, to screw each connecting member 41 into the nut 40 in the annular raised portion 25, the distal end 42b is placed into surface contact with the bottom 29 of the annular recess 28, which also serves as the bottom of the threaded bore 40a. This increases the tightening margin of the external thread 43 in the connecting member 41, and reduces the radially inward protruding amount of the annular raised portion 25, which serves as a boss unit for the internal threads 40b. This reduces the weight of the wheel.

Moreover, when the connecting member 41 is rotated and screwed, the large-diameter portion 42 is positioned by e distal end 42b of the large-diameter portion 42 in the fastening direction coming into surface contact with the bottom 29 of the annular recess 28. This allows the connecting member 41 to have a constant tightening margin, and eases the fastening work.

In this connected state, the surface of the step 42a on the connecting member 41 is flush with the inner peripheral surface 25a forming the opening edges of its adjacent nuts 40, and the external threads 43 do not protrude from the nuts 40. This improves the appearance.

Additionally, with the large-diameter portions 42 connected to the nuts 40 in the annular raised portion 25, only the spoke guides 44 protrude from the annular raised portion 25. Thus, smaller portions of the connecting members 41 protrude from the annular raised portion 25. This reduces the weight of the wheel, and improves the appearance.

Further, at least a part (the lower end in FIG. 5A) of the external thread 43 arranged on each connecting member 41 is located more radially inward than the engagement between the step 48 on the connecting member 41 and the spoke head 50. Thus, the force applied to the connecting member 41 through the spoke head 50 is less directly transferred to the screw connecting portion between the nut 40 and the external thread 43. This maintains the reliable connection between the external thread 43 and the internal thread 40b.

The bending angle of each spoke 18 is equal to or less than 30°. The resultant small angle of the spokes 18 optimizes the strength of the spokes 18. In addition, the hub 14 can be shortened in the vehicle width direction.

Additionally, the hollow 26a is arranged in each shoulder bead 26 connecting the annular raised portion 25, which serves as a boss unit for the internal threads 40b, to the corresponding side flange 22 that is in contact with the tire 13. The hollow 26a thus reduces the weight of the rim 21. Moreover, the flat wall 27a, the tilted extension 27b, and the inner peripheral wall 27c, which define the hollow 26a, each serve as a rib to increase the rigidity of the rim 21.

REFERENCE SIGNS LIST 10 tired front wheel
14 hub
18 spoke
20 wheel
21 rim
24 air space
25 annular raised portion
31 right flange
32 left flange
34 forward boss
35 rearward boss
40 nut
40b internal thread
41 connecting member
43 external thread
44 spoke guide
45 tool contact surface
46 through-hole
48 step
50 spoke head
52 bend
53 tilted extension
54 basal end
55 external thread
60 nipple
61 boss
62 nipple head
63 internal thread

What is claimed is:
1. A tubeless spoked wheel structure comprising
a tubeless spoked wheel including a rim and a tire defining an air space, and wire spokes connecting the rim and a hub to integrate the wheel, the air space sealed to maintain a pressure of the tire, wherein
the rim includes an annular raised portion arranged around the entirety of a centerline of the rim in a vehicle width direction, the annular raised portion having a bore with an internal thread that is arranged along the annular raised portion and is not in communication with the air space, the annular raised portion protruding radially inwardly to have a height corresponding to a length of the internal thread,
each spoke includes a spoke head arranged at a distal end nearer to the rim, and an external thread arranged at a basal end nearer to the hub, the rim and the distal end of each spoke are connected with a connection including a connecting member having an outer periphery including an external thread that is screwed into the internal thread, each internal thread in the rim extends parallel to a radial direction of the rim, the connecting member is connected to the internal thread parallel to the radial direction of the rim, the connecting member has a hollow for receiving the spoke head of the spoke that is engaged rotatably about a central axis of the connecting member, the connecting member is screwed into the internal thread, and the external thread arranged at the basal end of each spoke is screwed in a nipple assembled with the hub.

2. The tubeless spoked wheel structure according to claim 1, wherein each spoke includes a bend extending from the connecting member rightward or leftward toward the hub.

3. The tubeless spoked wheel structure according to claim 2, wherein the bend of each spoke has a bending angle equal to or less than 30°.

4. The tubeless spoked wheel structure according to claim 2, wherein the internal thread is aligned circumferentially along the centerline of the rim in the vehicle width direction.

5. The tubeless spoked wheel structure according to claim 4, wherein the rim includes, in the vehicle width direction, flanges in contact with the tire at ends of the rim, and hollows formed in portions connecting the boss unit and the flanges.

6. The tubeless spoked wheel structure according to claim 1, wherein the internal thread is aligned circumferentially along the centerline of the rim in the vehicle width direction.

7. The tubeless spoked wheel structure according to claim 6, wherein the rim includes, in the vehicle width direction, along the centerline, flanges in contact with the tire at ends of the rim, and hollows formed in portions connecting the annular raised portion and the flanges.

8. The tubeless spoked wheel structure according to claim 7, wherein the connecting member includes a large-diameter portion having the external thread and a spoke guide having a smaller diameter than the large-diameter portion integral with each other, and the spoke guide protrudes from the annular raised portion toward the hub.

9. The tubeless spoked wheel structure according to claim 8, wherein the spoke guide has a tool contact surface including a plane surface configured to stop rotation of a tool in contact with the surface.

10. The tubeless spoked wheel structure according to claim 9, wherein an end of the external thread in the connecting member is flush with an end of the corresponding internal thread in the rim when the external thread in the connecting member is screwed into the internal thread.

11. The tubeless spoked wheel structure according to claim 8, wherein an end of the external thread in the connecting member is flush with an end of the corresponding internal thread in the rim when the external thread in the connecting member is screwed into the internal thread.

12. The tubeless spoked wheel structure according to claim 7, wherein, when the connecting member is screwed into the internal thread in the rim, a distal end of the connecting member in a fastening direction is placed into surface contact with a bottom of the annular raised portion having the internal threads.

13. The tubeless spoked wheel structure according to claim 12, wherein at least a part of the external thread in the connecting member is located more radially inward than an engagement between the connecting member and the spoke.

14. A tubeless spoked wheel assembled to a tire and defining a sealed air space, the tubeless spoked wheel comprising:

a rim including an annular raised portion arranged around the entirety of a centerline of the rim in a vehicle width direction, the annular raised portion having a bore with an internal thread arranged along the annular raised portion and not being in communication with the air space, the internal thread extending in a radial direction of the rim, the annular raised portion protruding radially inwardly to have a height corresponding to a length of the internal thread;

a connecting member having an outer periphery including an external thread that is screwed into the internal thread, the connecting member extending in the radial direction of the rim, the connecting member having a hollow;

a hub having a nipple; and wired spokes connecting the connecting member and the hub, each spoke including a spoke head arranged at a distal end nearer to the rim and received in the hollow, the spoke head engaged rotatably about a central axis of the connecting member, and an external thread arranged at a basal end nearer to the hub, the external thread of the spoke screwed in the nipple.

15. The tubeless spoked wheel according to claim 14, wherein the hub includes a right flange and a left flange, and the spokes include right spokes extending toward right from a bend and connected to the right flange, and left spokes extending toward left from the bend and connected to the left flange.

16. The tubeless spoked wheel according to claim 15, wherein the right spokes include forward-tilted right spokes tilted in a rotational forward direction, and rearward-tilted right spokes tilted in a rotational rearward direction, and the left spokes include forward-tilted left spokes tilted in the rotational forward direction, and rearward-tilted left spokes tilted in the rotational rearward direction.

17. A tubeless spoked wheel assembled to a tire and defining a sealed air space, the tubeless spoked wheel comprising:
- a rim including an annular raised portion arranged around the entirety of a centerline of the rim in a vehicle width direction, the annular raised portion having bores spaced at regular intervals from one another along the annular raised portion, each of the bores having an internal thread that extends in a radial direction of the rim and is not in communication with the sealed air space, the annular raised portion protruding radially inwardly to have a height corresponding to a length of the internal thread;
- connecting members, each of the connecting members having an outer periphery including an external thread that is screwed into the internal thread, the connecting members extending in the radial direction of the rim, and each of the connecting members having a hollow;
- a hub having a nipple; and
- wired spokes connecting the connecting members and the hub, each spoke including
    - a spoke head arranged at a distal end nearer to the rim and received in the hollow, the spoke head engaged rotatably about a central axis of the connecting member, and
    - an external thread arranged at a basal end nearer to the hub, the external thread of the spoke screwed into the nipple.

* * * * *